July 24, 1951
O. P. LEONARD
2,561,876
AIR COOLING INSTALLATION FOR AUTOMOBILES
Filed Sept. 26, 1949
2 Sheets-Sheet 1
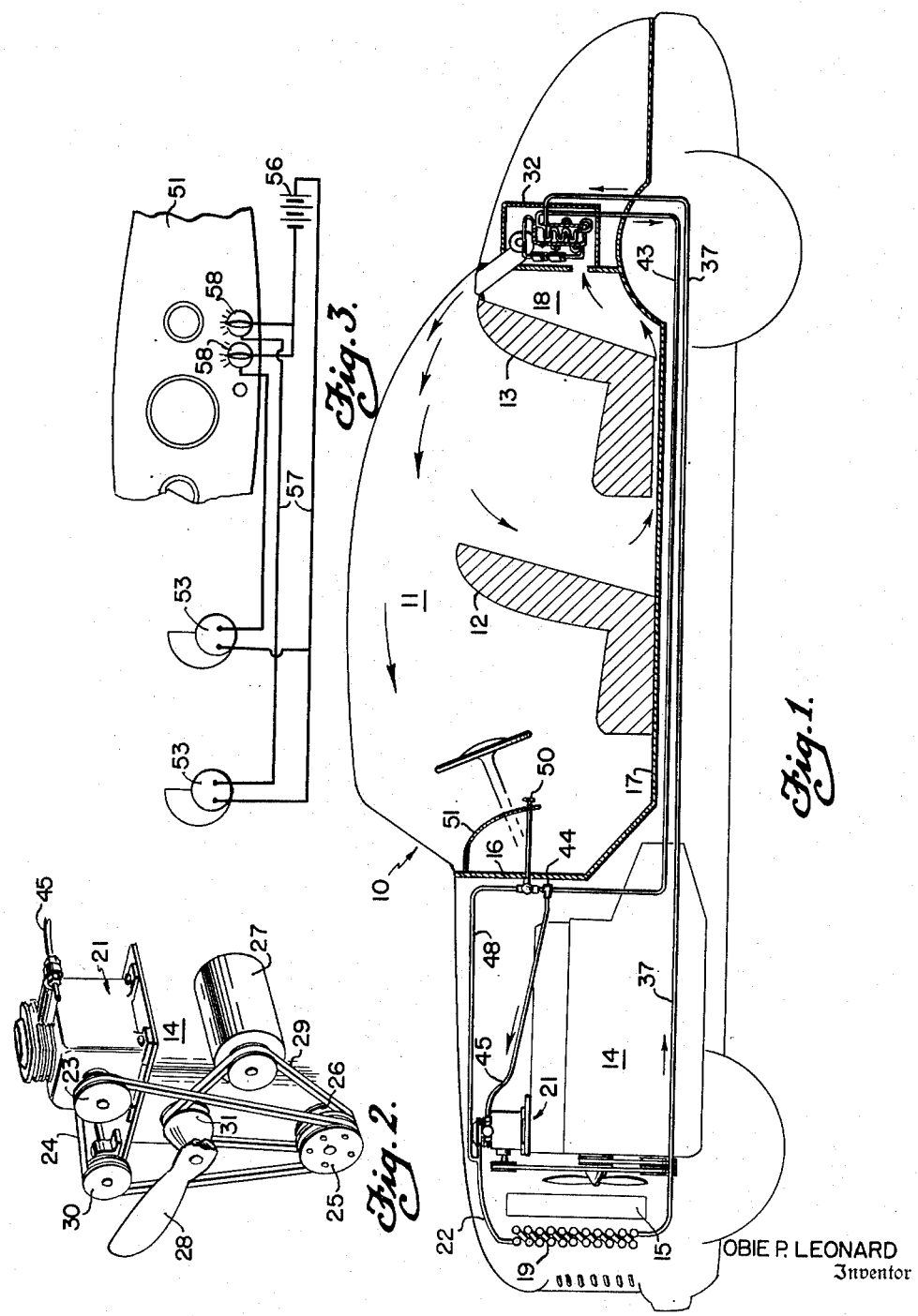
OBIE P. LEONARD
Inventor
By Herbert J. Brown
Attorney July 24, 1951  O. P. LEONARD  2,561,876
AIR COOLING INSTALLATION FOR AUTOMOBILES
Filed Sept. 26, 1949  2 Sheets-Sheet 2
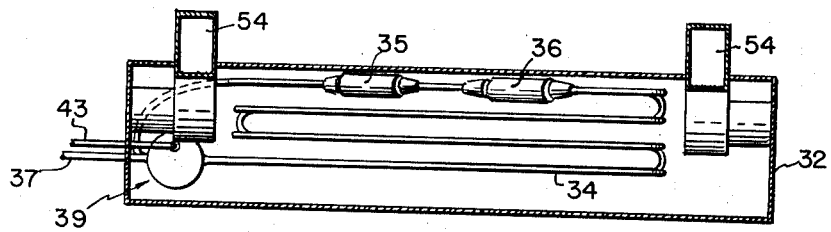
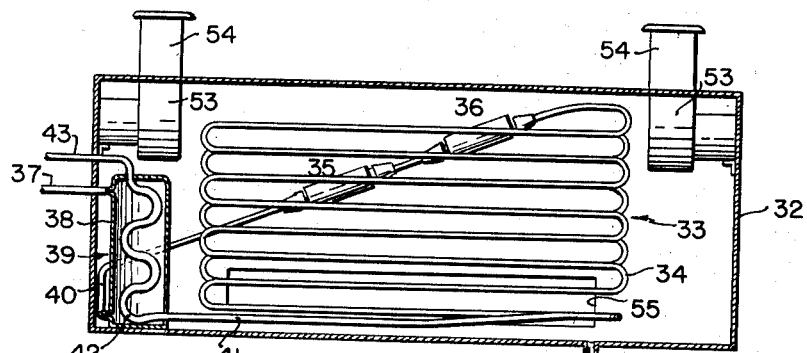
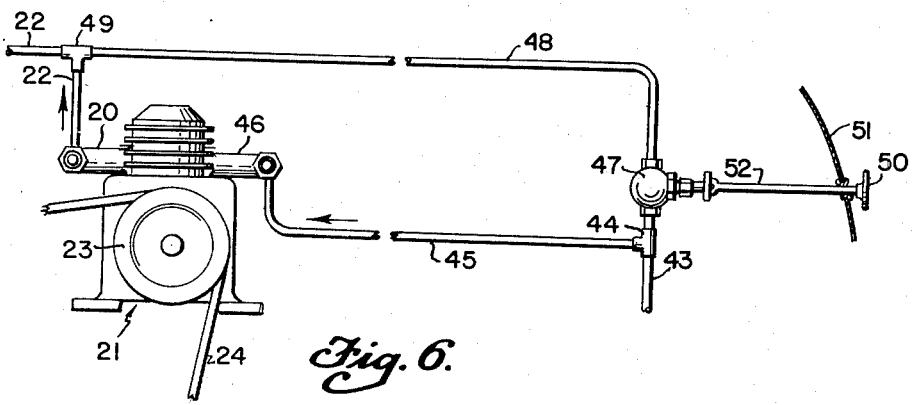
OBIE P. LEONARD
Inventor
By Herbert J. Brown
Attorney Patented July 24, 1951

2,561,876

UNITED STATES PATENT OFFICE 2,561,876

AIR COOLING INSTALLATION FOR AUTOMOBILES

Obie P. Leonard, Fort Worth, Tex.

Application September 26, 1949, Serial No. 117,835

1 Claim. (Cl. 62—117.1)

This invention relates to improvements in air conditioning systems for automobiles.

An object of the invention is to provide a simplified construction and arrangement of parts for automobile cooling systems whereby the cost of installation may be materially reduced.

Another object of the invention is to provide, in a refrigerated air conditioning system for an automobile, an inexpensive control means for regulating the temperature within the vehicle.

A further object of the invention is to provide an arrangement of parts in a system of the described class whereby the interior of the vehicle is more effectively cooled.

These and other objects of the invention will become apparent from the following description and the accompanying drawings, wherein:

Figure 1 is a side view of an automobile equipped with a cooling system embodying the present invention.

Figure 2 is a perspective view of the forward end of the automobile engine and showing the location of the compressor, together with means for driving the same.

Figure 3 is a wiring diagram of the fan regulating means.

Figure 4 is a plan sectional view of the cooling unit.

Figure 5 is a vertical sectional view of the cooling unit illustrated in Figure 5, and Figure 6 is an elevation of the temperature control means.

The form of the invention shown is installed in an automobile 10 having a closed passenger compartment 11, seats 12 and 13 therein, an engine 14 and a radiator 15 in front of the engine. The automobile 10 also includes a dash 16, floor 17, and a rear compartment 18.

The condenser 19 of the cooling system is positioned in front of the radiator 15 and is connected with the refrigerant discharge 20 of a compressor 21 mounted on the engine 14. The referred to connection is by means of a tubular line 22, as shown in Figures 1 and 6. The compressor 21 has a driven pulley 23 connected by means of a belt 24 with an auxiliary pulley 25 secured to the forward end of the generator driving pulley 26; thus, the compressor is driven whenever the engine runs by reason of the direct connection therebetween. There are no clutches or other temporary connections between the engine 14 and the compressor 21. By securing the auxiliary pulley 25 concentrically with the generator driving pulley 26, the automobile's standard construction for driving the generator 27 and fan 28 by a belt 29 remains unchanged. Preferably, the belt 24 for driving the compressor 21 is provided with an auxiliary or idler pulley 30 mounted on the engine 14 so as to avoid interference with the pulley 31 for driving the fan 28.

Within the rear compartment 18 there is a housing 32 for enclosing the cooling unit, generally designated by the numeral 33. The unit 33 is comprised of a cooling coil 34, a dehydrator 35, and an expansion valve 36. The refrigerant in the condenser 19 flows through a tubular line 37 and is connected with the upper end of the tank 38 of a heat exchanger 39. The lower end of the tank 38 is connected, by means of a line 40, with the dehydrator 35 and the expansion valve 36, in the order named. The return 41 from the cooling coil 34 is connected with a small condenser 42 in the tank 38 of the heat exchanger 39. A return line 43 is connected with the last referred to condenser 42 and extends to the compressor 21, where it connects a T 44 forwardly of the dash 16. A line 45 connects one of the branches of the T 44 with the intake 46 of the compressor 21, whereas the remaining branch of the T is connected with a valve 47, which, in turn, is connected by means of another line 48 with a T connection 49 in the first referred to tubular line 22 connected with the discharge 20 of the compressor. The valve 47 is operated by a hand wheel 50 mounted on the instrument panel 51, and which wheel is connected with said valve by means of a shaft 52.

Squirrel cage fans 53 are mounted in the upper and opposite ends of the cooling unit housing 32 and have their discharge ducts 54 directed upwardly and over the rear automobile seat 13. An inlet opening 55 is provided in the forward lower area of the housing 32. The fans 53 are energized by the automobile battery 56 and are connected therewith by means of wires 57, as shown in Figure 3. Rheostats 58 are mounted on the instrument panel 51 regulating the fans 53. The wiring may be arranged in any suitable manner, but preferably the rheostats 58 control their respective fans 53 independently of each other.

In operation, the refrigerant is pumped from the compressor 21 into the condenser 19 through the line 22, and thence to the heat exchanger 39. The refrigerant is then delivered to the dehydrator 35 by means of the connecting line 40, and thence to the expansion valve 36. Expansion of the refrigerant in the cooling coil 34 reduces the temperature of the air within the housing 32, from where it is blown outwardly by means of the fans 53, into the interior of the automobile. The air then returns to the housing 32 through the opening 55 where it is again cooled and redischarged into the interior of the automobile by the described means. The rear seat 13 is raised and supported by suitable means for passage of the return air therebeneath to the housing opening 55. The refrigerant, after leaving the coil 34 enters the small condenser 42 within the heat exchanger 39 where its temperature is appreciably decreased by reason of the presence of the refrigerant within the stabilizer housing 38. The refrigerant then continues from the small condenser 42, through the connecting lines 43 and 45, to the intake 46 of the compressor 21. By reason of the pressure differential between the compressor intake 46 and the compressor discharge 20, a bypass arrangement is provided when the control valve 47 is open, or partially open. The refrigerant delivered from the compressor 21, when the valve 47 is open, will divide at the connecting T 49, and part of which will thence pass through the line 48 to the valve 47, and return to the compressor intake 46. Thus, by means of the control wheel 50, the effectiveness of the entire system may be increased or decreased as desired.

The described form of the invention may be made in many ways within the scope of the appended claim.

What is claimed is:

An air cooling installation for an automobile having a closed passenger compartment, seats within said compartment, an engine within the forward end of said automobile, a rear compartment adjacent the first said compartment and a dashboard forwardly of one of said seats, said installation comprising: a compressor mounted on and directly driven by said engine, said compressor including a refrigerant inlet and a refrigerant discharge, a housing positioned within said rear compartment and adjacent said passenger compartment, a cooling unit within said housing, a tubular line connecting said discharge of said compressor with said cooling unit, and a return tubular line connecting said cooling unit with said inlet of said compressor, a bypass line connecting said return line with the first said line, a manually controlled valve connected with said bypass line and positioned for operation from said dashboard, air discharge ducts in the upper surface and in opposite ends of said housing and directed over the adjacent said automobile seat, means supporting the last said seat in a raised position and above an inlet opening in said housing wall near the bottom thereof, fans mounted within said housing and opposite the inner ends of said ducts, and speed control means mounted on said dash for controlling the speed of said fans.

OBIE P. LEONARD.

REFERENCES CITED

The following references are of record in the file of this patent:

UNITED STATES PATENTS

| Number | Name | Date |
| --- | --- | --- |
| 1,866,659 | Little, Jr. | July 12, 1932 |
| 2,077,974 | Wishart | Apr. 20, 1937 |
| 2,080,358 | Kucher | May 11, 1937 |
| 2,180,760 | Mayo | Nov. 21, 1939 |
| 2,212,503 | Nickell | Aug. 27, 1940 |
| 2,216,690 | Madden | Oct. 1, 1940 |
| 2,495,350 | Smith | Jan. 24, 1950 |